(12) United States Patent  
Koo

(10) Patent No.: US 7,159,130 B2
(45) Date of Patent: Jan. 2, 2007

(54) PORTABLE COMPUTER USING A FUEL CELL

(75) Inventor: Ja-goun Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 10/822,842

(22) Filed: Apr. 13, 2004

(65) Prior Publication Data

US 2004/0265650 A1 Dec. 30, 2004

(30) Foreign Application Priority Data

Jun. 25, 2003 (KR) .................... 10-2003-0041651

(51) Int. Cl.
*G06F 1/26* (2006.01)
(52) U.S. Cl. ...................... 713/300; 429/34
(58) Field of Classification Search ............ 713/300; 703/300; 429/34
See application file for complete search history.

(56) References Cited

U.S. PATENT DOCUMENTS

| 5,932,365 | A |  | 8/1999 | Lin et al. |
| 6,326,097 | B1 | * | 12/2001 | Hockaday .................... 429/34 |
| 6,447,945 | B1 |  | 9/2002 | Streckert et al. ............. 429/34 |
| 6,910,138 | B1 | * | 6/2005 | Hayashi et al. ............. 713/300 |
| 2002/0026594 | A1 |  | 2/2002 | Hayashi et al. |
| 2002/0055029 | A1 |  | 5/2002 | Hayashi et al. ............... 429/34 |
| 2003/0142467 | A1 | * | 7/2003 | Hachiya et al. .............. 361/681 |
| 2004/0185314 | A1 | * | 9/2004 | Miyamoto et al. ............. 429/22 |
| 2004/0209142 | A1 | * | 10/2004 | Becerra et al. ............... 429/34 |
| 2004/0219414 | A1 | * | 11/2004 | Ozeki .......................... 429/34 |
| 2005/0014041 | A1 | * | 1/2005 | Becerra et al. ............... 429/22 |

FOREIGN PATENT DOCUMENTS

| JP | 9-179659 | 7/1997 |
| JP | 2002-169625 | 6/2002 |
| JP | 2002-169629 | 6/2002 |
| KR | 2002-84205 | 11/2002 |

* cited by examiner

*Primary Examiner*—Thomas Lee
*Assistant Examiner*—Vincent Tran
(74) *Attorney, Agent, or Firm*—Staas & Halsey LLP

(57) ABSTRACT

A portable computer including, a CPU operable in a maximum performance mode or in a low power consuming mode according to circumstances, supplied power from a fuel cell, the portable computer further including: a primary fuel valve enabling the fuel cell to be supplied fuel from an external source; a signal sensor sensing an external fuel supplying signal from the primary fuel valve; and a controller controlling the CPU to be operated in the maximum performance mode based on the sensed external fuel supplying signal. Thus, the CPU and the peripheral device is operated in the maximum performance mode when the portable computer receives the power from the external fuel tank, and operated in the low power consuming mode when receiving the power from the fuel cartridge in the fuel cell, thereby enabling maximum use time of the fuel cell. Furthermore, the portable computer which can use both of the AC/DC power and the fuel cell as a power source outputs the external power input signal generated when it receives the power from the AC/DC adapter or the fuel from the fuel tank and is operated in the maximum performance mode.

18 Claims, 2 Drawing Sheets

PORTABLE COMPUTER USING A FUEL CELL

CROSS-REFERENCE TO RELATED APPLICATIONS

This application claims the benefit of Korean Patent Application No. 2003-41651, filed Jun. 25, 2003, in the Korean Intellectual Property Office, the disclosure of which is incorporated herein by reference.

BACKGROUND OF THE INVENTION

1. Field of the Invention

The present invention relates to a portable computer, in particular to a portable computer using a fuel cell which can be refueled anytime, thereby efficiently supplying power to the portable computer.

2. Description of the Related Art

In general, a portable computer is designed to be supplied power by using an AC/DC (Alternating Current/Direct Current) adapter, or a portable battery such as a chemical cell, I for example, a lithium-ion cell.

The chemical cell uses electrical energy generated from a chemical reaction with an electrode. However, to reuse the chemical cell, the cell has to be recharged with AC power once the chemical reaction is complete.

As described above, the portable battery has a limited amount of supply power. Thus, by limiting the amount of power supplied to the CPU, it is possible to increase use time. Accordingly, it is an aspect of the present invention to set a power-consuming mode in the CPU (Central Processing Unit) to a low-power mode.

That is, a portable computer generally designed to be supplied power from an AC power source and/or the portable battery can be supplied a constant amount of power from the AC power source, therefore the CPU and the peripheral device of the portable computer can receive a high voltage for a maximum performance. This condition is configured as a high performance mode.

Contrary to the above-described aspect, the portable battery supplies the portable computer with a limited amount of power, therefore low power is supplied to the CPU and the peripheral device reducing the number of performances to be used in the low power mode. This condition is configured as a low power-consuming mode.

As described above, operating the portable computer by controlling the power supplied to the CPU and the peripheral device based on the power source can increase the use time of the portable battery having a limited amount of power supply.

Other aspects of increasing the use time of the portable battery can be obtained by setting the CPU to a low power-consuming mode, thus saving the power of the portable battery, or by increasing a capacity of a conventional portable battery.

Meanwhile, unlike conventional chemical cells generating the electrical energy by inserting the reactant therein in advance, a fuel cell of the present invention is designed to continuously supply the reactant from outside of the chemical cell, and continuously remove a reaction product to the outside.

FIG. 1 is a control block diagram of a portable computer comprising a fuel cell according to the conventional technology. As shown therein, the conventional portable computer comprises a fuel cell 7 as a power source; a power supplier 5 supplying power received from the fuel cell 7 to a controller 3 and a peripheral device 9; the controller 3 controls the power supplier 5 to supply a standard amount of power by supplying voltage information when the power supplier 5 supplies power to the controller 3 and the peripheral device 9.

The fuel cell 7 generates electrical energy by creating a chemical reaction in a chemical reaction part 7b using hydrogen or methanol in a fuel cartridge 7a and oxygen in the air.

The electrical energy is transferred to the power supplier 5, and a microcomputer 31 senses that the fuel cell 7 is supplying the power and signals a chipset 33, the chipset 33 notifies processor 35 that the fuel cell is supplying the power through a pre-defined control signal or a system bus. Thereafter, the chipset 33 and the processor 35 supply a predetermined standard voltage information to the CPU and the peripheral device, and the power supplier 5 receives the standard voltage information and regulates the power to have a comparatively low voltage and supplies power to the CPU and the peripheral device.

Herein, the fuel cell 7 can be fueled by the fuel cartridge 7a provided therein, but can be designed to be fueled by a comparatively bigger external fuel tank.

The portable computer comprising the fuel cell, which can be fueled by the external fuel tank, may require a power management similar to a system using a conventional chemical cell.

SUMMARY OF THE INVENTION

Accordingly, it is an aspect of the present invention to provide a portable computer comprising a fuel cell continuously refueled from the outside, thereby efficiently supplying power thereto.

The foregoing and/or other aspects of the present invention are also achieved by providing a portable computer comprising a CPU operable in a maximum performance mode or in a low power consuming mode according to circumstances, and can be supplied power from a fuel cell, the portable computer further comprising: a primary fuel valve enabling the fuel cell to be supplied fuel from an external source; a signal sensor sensing an external fuel supplying signal from the primary fuel valve; and a controller controlling the CPU to be operated in the maximum performance mode based on the sensed external fuel supplying signal.

According to an aspect of the invention, the portable computer further comprises a secondary fuel valve enabling the fuel cell to be supplied fuel from a fuel cartridge in the fuel cell, and wherein the signal sensor senses an internal fuel supplying signal from the secondary fuel valve, and the controller controls the CPU to be operated in the low power consuming mode based on the sensed internal fuel supplying signal.

According to an aspect of the invention, the portable computer, further includes a connecter which an AC/DC adapter is connected to an external AC power supply; a DC/DC and charger sensing that the external AC power is being supplied and outputs an AC power supplying signal, and wherein the controller controls the CPU to operate in the maximum performance mode if there exists either the external fuel supplying signal or the AC power supplying signal.

According to an aspect of the invention, the portable computer further comprises a signal sensor receiving the external fuel supplying signal and the AC power supplying signal and outputting an external power input signal if at least one of the external fuel supplying signal and the AC power supplying signal exists, and wherein the controller controls the CPU to operate in the maximum performance mode based on the external power input signal.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
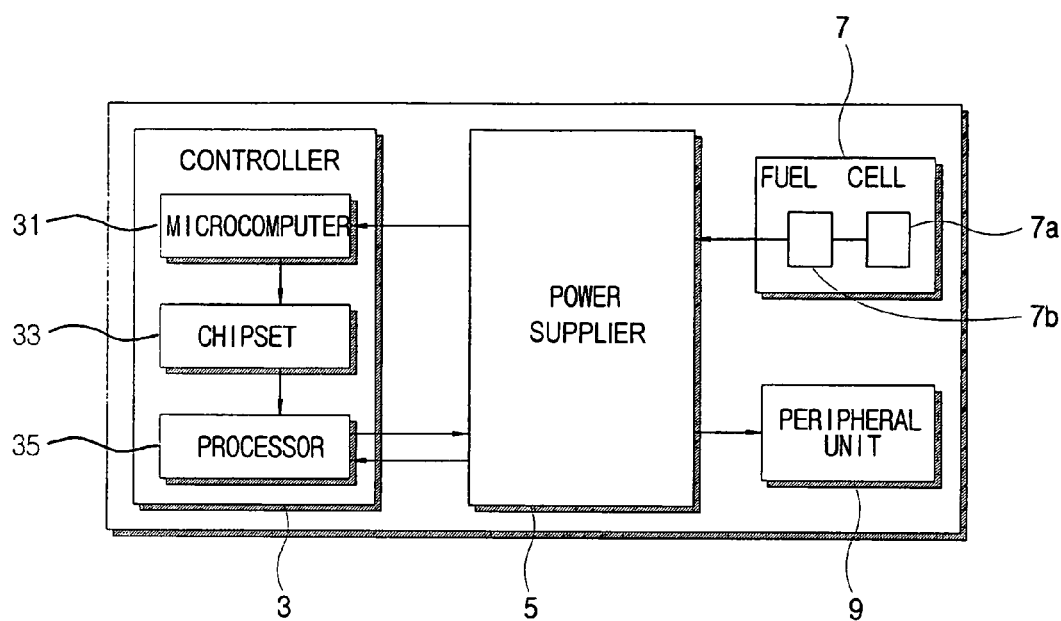
FIG. 1 is a control block diagram of a portable computer comprising a fuel cell according to conventional technology.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
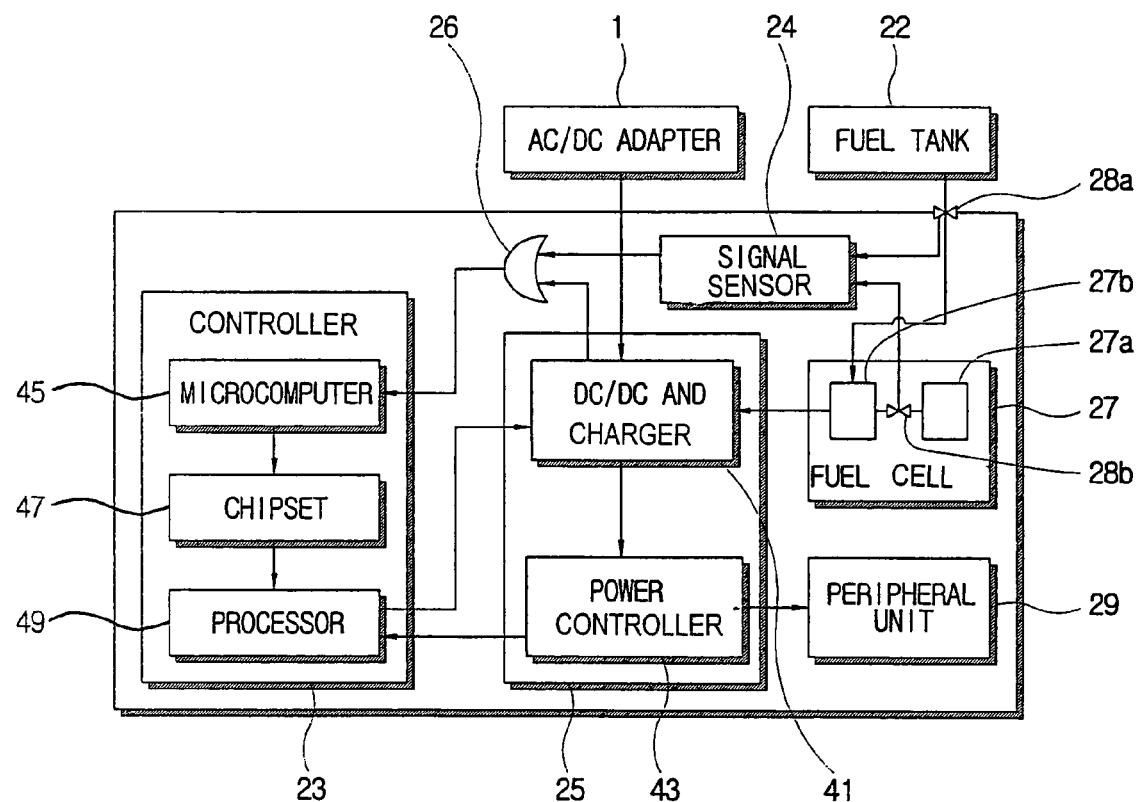
FIG. 2 is a control block diagram of a power supply for a portable computer according to an embodiment of the present invention.

FIG. 2 is a control block diagram of a power supply for a portable computer according to the present invention. As shown therein, the portable computer according to the present invention comprises an AC/DC (Alternating Current/Direct Current) adapter 1 as a main power source; a fuel cell 27 as another power source; a power supplier 25 receiving power from the AD/DC adapter 1 and the fuel cell 27, and supplying a signal to a controller 23 and power to a peripheral unit 29; the controller 23 controlling the power supplier 25 by providing predetermined standard voltage information required for the power supplier 25 to supply the power to the controller 23 and the peripheral unit 29.

The portable computer further comprises a fuel tank 22 fueling the fuel cell 27, and a signal sensor 24 receiving a fuel supplying signal from a primary fuel valve 28a and a secondary fuel valve 28b enabling the portable computer to be respectively fueled from the fuel tank 22 and a fuel cartridge 27a in the fuel cell 27.

Herein, as one of power generating devices, the fuel cell 27 generates electrical energy by creating a chemical reaction in a chemical reaction part 27b using hydrogen or methanol in a fuel cartridge 27a and oxygen in the air.

As for the fuel stored in the fuel cartridge 27a, almost any material supplied to the fuel cell 27 may be used, such as, gaseous fuel e.g., hydrogen, fossil fuel such as methane, natural gas, and the like, and liquid fuel such as methanol, hydrazine and the like may also be used.

A valve (hereinafter, refer to the secondary fuel valve 28b) provided in a passage connecting the fuel cartridge 27a and the chemical reaction part 27b senses the power being supplied, and mechanically outputs an internal fuel supplying signal to the signal sensor 24.

Herein, the valve 28b outputs a valve opening signal as soon as the fuel cell 27 is mounted to the portable computer, and also enables the valve opening signal to be recognized as the internal fuel supplying signal.

The fuel tank 22 contains the same material as the fuel contained in the fuel cartridge 27a. Similar to the fuel cartridge 27a, the supplied fuel is sensed by the valve 28a provided in the passage connecting the fuel tank 22 with the chemical reaction part 27b and a fuel supplying signal is output to the signal sensor 24. Here, the valve 28a is defined as a first fuel valve.

In the valve 28a, a valve opening signal of the valve 28a can be output when the fuel tank 22 is mounted on the portable computer and the valve opening signal can be recognized as an external fuel supplying signal.

The signal sensor 24 senses an external fuel supplying signal from the primary fuel valve 28a and the internal fuel supplying signal from the secondary fuel valve 28b, and respectively outputs control signals for the valves 28a and 28b.

By attaching a sensor in the primary fuel valve 28a and the secondary fuel valve 28b, the signal sensor 24 can sense flow quantity of the fuel or pressure in the valves generated by the flow of the fuel, and output control signals for the external fuel supplying signal and the internal fuel supplying signal.

The controller 23 receives the control signal from the signal sensor 24 and controls the power with an operation mode corresponding to the received signal.

If the controller 23 receives the external fuel supplying signal, when the portable computer is fueled from the fuel tank 22, the amount of power supplied is less limited, therefore operating the portable computer in a high performance mode. That is, the CPU and the peripheral device receive high electric power for a maximum performance.

On the other hand, if the controller 23 receives the internal fuel supplying signal, that is, the portable computer is fueled with the limited amount of the power from the fuel cartridge 27a in the fuel tank 27, the portable computer operates in a low performance mode, meaning supplying low electric power to the portable computer and the peripheral device reducing the number of performances to be operated in a low power-consuming mode.

The controller 23 comprises a microcomputer 45, a chipset 47, and a processor 49. The electrical energy generated from the chemical reaction in the chemical reaction part 27b receiving the fuel from fuel tank 22 is sent to the power supplier 25. The signal sensor 24 senses the external fuel supplying signal and signals the microcomputer 45 that the fuel tank is supplying the fuel. The microcomputer 45 sends information of the fuel supplying to the chipset 47, and the chipset 47 notifies the information to the processor 49 through the predetermined control signal or the system bus. Thereafter, the chipset 47 and the processor 49 transmit predetermined standard voltage information of the CPU and the peripheral device 29 from the power supplier 25 to a DC/DC (Direct Current) and charger 41. The DC/DC and charger 41 which received the information control power using the voltage information received from a power controller 43 and supplies the power to the CPU and the peripheral device.

Similarly, if the signal sensor 24 senses the internal fuel supplying signal, the power supplier 25 receives low voltage information, and the power is controlled corresponding to the low voltage and supplied to the CPU and the peripheral device.

The maximum performance mode and the low performance mode can apply or modify a speed step technology (or, geyserville). The speed step technology optimizes an operation mode of the CPU by determining a power source from either an AC (Alternating Current) power or a battery and is used in current Intel architecture or other systems. The speed step technology (or, geyserville) is implemented by decreasing the operation clock speed and the core voltage of the CPU thereby decreasing a performance speed.

When the AC/DC adapter is connected to a connector (not shown) provided in the portable computer to receive the AC power, the AC power is sent to the DC/DC and charger 41 and the DC/DC and charger 41 which received the AC power outputs an AC power supplying signal to the microcomputer 45.

The microcomputer 45 transfers the AC power supplying signal to the chipset 47, and the chipset 47 informs the predetermined standard voltage information to the processor 49 through the predetermined control signal or the system bus. The chipset 47 and the processor 49 transmit predetermined standard voltage information of the CPU and the peripheral device 29 from the power supplier 25, to the DC/DC (Direct Current) and charger 41, and the DC/DC and charger 41 which received the information controls the power using the voltage information received from the power controller 43 and supplies the power to the CPU and the peripheral device.

Herein, the portable computer can de designed to accommodate the portable battery having the fuel cell 27. In this case, the DC/DC and charger 41 can also recharge the portable battery discharged when both the AC/DC adapter 1 and the portable battery are mounted to the portable computer.

Among portable computers which can use both an AC/DC power and a fuel cell as a power source, the portable computer according to the present invention operates in the maximum performance mode when it receives the power from the AC/DC adapter 1, or the fuel from the fuel tank 22.

Therefore, if there exists either the external fuel supplying signal from the signal sensor 24 or the AC power supplying signal from the DC/DC and charger 41, an OR gate 26 generates a signal outputting the type of external power provided, thereby controlling the operation of the CPU in the maximum performance mode when the external power input signal is sent to the microcomputer 45.

In the above configuration, an operation mode of a CPU and a peripheral device of a portable computer receiving power from a fuel cell are changed depending on whether the portable computer is supplied fuel from a fuel cartridge in the fuel cell, or if the portable computer is supplied the fuel from an external fuel tank, thereby increasing use time of the fuel cell.

Accordingly, the CPU and the peripheral device operate in the maximum performance mode when the portable computer receives the power from the external fuel tank, and operate in the low power consuming mode when the CPU and the peripheral device receive power from the fuel cartridge in the fuel cell, thereby maximizing the use time of the fuel cell.

Furthermore, when the portable computer receives the power from the AC/DC adapter 1 or from the fuel from the fuel tank 22 the portable computer operates in the maximum performance mode.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer including a CPU operable in a maximum performance mode or in a low power consuming mode and supplied power from a fuel cell, the portable computer comprising:
    a primary fuel valve enabling the fuel cell to be supplied fuel from an external source;
    a signal sensor sensing an external fuel supplying signal from the primary fuel valve; and
    a controller controlling the CPU to operate in the maximum performance mode based on the sensed external fuel supplying signal.

2. The portable computer according to claim 1, further comprising a secondary fuel valve enabling the fuel cell to be supplied the fuel from a fuel cartridge in the fuel cell, and
    wherein the signal sensor senses an internal fuel supplying signal from the secondary fuel valve, and the controller controls the CPU to operate in the low power consuming mode based on the sensed internal fuel supplying signal.

3. The portable computer according to claim 1, further comprising:
    a connector, connecting an AC/DC adapter to an external AC power supply;
    a DC/DC and charger, sensing that the external AC power supply is supplying and outputting an AC power supplying signal, and
    wherein the controller controls the CPU to operate in the maximum performance mode if either the external fuel supplying signal or the AC power supplying signal is supplied.

4. The portable computer according to claim 2, further comprising:
    a connector, connecting an AC/DC adapter to an external AC power supply;
    a DC/DC and charger, sensing that the external AC power supply is supplying and outputting an AC power supplying signal, and
    wherein the controller controls the CPU to operate in the maximum performance mode if either the external fuel supplying signal or the AC power supplying signal is supplied.

5. The portable computer according to claim 3, further comprising a signal sensor receiving the external fuel supplying signal and the AC power supplying signal and outputting an external power input signal if at least one of the external fuel supplying signal and the AC power supplying signal exists, and wherein the controller controls the CPU to operate in the maximum performance mode based on the external power input signal.

6. A portable computer, comprising:
    a primary fuel valve controlling a fuel supply from an external source to a fuel cell;
    a signal sensor sensing an external fuel supplying signal from the primary fuel valve; and
    a controller controlling a CPU to operate in a maximum performance mode based on the sensed external fuel supplying signal.

7. The portable computer according to claim 6, further comprising a secondary fuel valve controlling a fuel supply from a fuel cartridge in the fuel cell, and
    wherein the signal sensor senses an internal fuel supplying signal from the secondary fuel valve, and the controller controls the CPU to operate in a low power consuming mode based on the sensed internal fuel supplying signal.

8. The portable computer according to claim 6, further comprising:
a connector, connecting an AC/DC adapter to an external AC power supply;
a DC/DC and charger, sensing that the external AC power supply is supplying and outputting an AC power supplying signal, and
wherein the controller, controls the CPU to operate in the maximum performance mode if either the external fuel supplying signal or the AC power supplying signal is supplied.

9. The portable computer according to claim 7, further comprising:
a connecter, connecting an AC/DC adapter to an external AC power supply;
a DC/DC and charger, sensing that the external AC power supply is supplying and outputting an AC power supplying signal, and
wherein the controller, controls the CPU to operate in the maximum performance mode if either the external fuel supplying signal or the AC power supplying signal is supplied.

10. The portable computer according to claim 8, further comprising:
a signal sensor receiving the external fuel supplying signal and the AC power supplying signal and outputting an external power input signal if at least one of the external fuel supplying signal and the AC power supplying signal is supplied, and wherein the controller controls the CPU to be operated in the maximum performance mode on the external power input signal.

11. A portable computer, comprising:
a primary fuel valve controlling a fuel supply from an external source to a fuel cell;
a secondary fuel valve controlling a fuel supply from a fuel cartridge in the fuel cell;
a signal sensor sensing an external fuel supplying signal from the primary fuel valve or an internal fuel supplying signal from the secondary fuel valve; and
a controller controlling a CPU to operate in a maximum performance mode or a low power consuming mode based on the internal or external sensed fuel supplying signal.

12. The portable computer according to claim 11, further comprising:
a connector, connecting an AC/DC adapter to an external AC power supply;
a DC/DC and charger, sensing that the external AC power supply is supplying and outputting an AC power supplying signal,
wherein the controller controls the CPU to operate in the maximum performance mode if either the external fuel supplying signal or the AC power supplying signal is supplied.

13. The portable computer according to claim 12, further comprising:
a signal sensor receiving the external fuel supplying signal and the AC power supplying signal and outputting an external power input signal if at least one of the external fuel supplying signal and the AC power supplying signal exists, and wherein the controller controls the CPU to be operated in the maximum performance mode based on the external power input signal.

14. The portable computer according to claim 11, wherein if the controller receives the external fuel supplying signal, the amount of power supplied to the computer is larger and the portable computer operates in the maximum performance mode.

15. The portable computer according to claim 11, wherein if the controller receives the internal fuel supplying signal, the amount of power supplied to the computer is limited and the portable computer operates in the lower power consuming mode.

16. A method of controlling an operation of a portable computer, comprising:
sensing an external fuel supplying signal from a primary fuel valve or sensing an internal fuel supplying signal from a secondary fuel valve; and
controlling the portable computer to operate in a maximum performance mode or in a low power consuming mode based on the sensed external fuel supplying signal or on the sensed internal fuel supplying signal.

17. The method according to claim 16, wherein a DC/DC and charger, sense if an external AC power supply is supplying power to the portable computer and outputs an AC power supplying signal,
wherein the portable computer operates in the maximum performance mode if either an external fuel supplying signal or an AC power supplying signal is supplied.

18. The method according to claim 16, wherein an operation mode of a CPU and a peripheral device of the portable computer, depends on whether the portable computer is supplied fuel from a fuel cartridge in a fuel cell, or from an external fuel tank, to increase use time of the fuel cell.

* * * * *